(12) United States Patent
Yu

(10) Patent No.: US 9,149,992 B2
(45) Date of Patent: Oct. 6, 2015

(54) CARBON FIBER RIM FOR BICYCLE AND METHOD OF MANUFACTURING THE SAME

(71) Applicant: Ting Yao Yu, Hsinchu County (TW)

(72) Inventor: Ting Yao Yu, Hsinchu County (TW)

( * ) Notice: Subject to any disclaimer, the term of this patent is extended or adjusted under 35 U.S.C. 154(b) by 149 days.

(21) Appl. No.: 14/159,539

(22) Filed: Jan. 21, 2014

(65) Prior Publication Data

US 2015/0202828 A1    Jul. 23, 2015

(51) Int. Cl.
| | | |
|---|---|---|
| *B60B 5/02* | (2006.01) | |
| *B29C 70/54* | (2006.01) | |
| *B29C 70/34* | (2006.01) | |
| *B29L 31/32* | (2006.01) | |
| *B29K 105/08* | (2006.01) | |
| *B29K 307/04* | (2006.01) | |

(52) U.S. Cl.
CPC ............... *B29C 70/543* (2013.01); *B29C 70/34* (2013.01); *B60B 5/02* (2013.01); *B29K 2105/0872* (2013.01); *B29K 2307/04* (2013.01); *B29L 2031/32* (2013.01); *B60B 2310/242* (2013.01); *B60B 2360/3416* (2013.01); *B60B 2900/111* (2013.01); *B60B 2900/311* (2013.01); *B60Y 2200/13* (2013.01)

(58) Field of Classification Search
CPC ...... B60B 5/00; B60B 5/02; B60B 2310/241; B60B 2310/242; B60B 2360/34; B60B 2360/341; B60B 2360/3416; B60B 2360/342; B60B 2360/3422; B60B 2360/3424; B60B 2360/346; B60B 2360/3462; B60B 2360/3464; B29C 70/30; B29C 70/34; B29C 70/347; B29C 70/54; B29C 70/543
USPC ............. 301/95.101, 95.102, 95.103, 95.104, 301/95.106
See application file for complete search history.

(56) References Cited

U.S. PATENT DOCUMENTS

| | | | | |
|---|---|---|---|---|
| 4,832,414 | A * | 5/1989 | Jones ........................ | 301/64.703 |
| 8,070,235 | B2 * | 12/2011 | Reuteler ................... | 301/95.103 |
| 8,491,828 | B2 * | 7/2013 | Wetzels et al. ............. | 264/257 |

* cited by examiner

*Primary Examiner* — John Walters
(74) *Attorney, Agent, or Firm* — Rosenberg, Klein & Lee

(57) ABSTRACT

A method of manufacturing carbon fiber rim for bicycle comprising steps of: preparing at least one preformed mold, separating from the preformed main mold, connecting with an inner framework, and solidifying; wherein plural carbon-fiber prepreg wires are repeatedly on a preformed carbon fiber case at least twice so as to form at least two rolling layers, and each rolling layer is at varying angle. Also, a carbon fiber rim for bicycle contains: an inner framework having a profile corresponding to a carbon fiber rim; and a preformed carbon fiber case at least covering a part of the inner framework and being successive rolled by plural carbon-fiber prepreg wires relative to a set angle of an axis normal.

4 Claims, 15 Drawing Sheets

CARBON FIBER RIM FOR BICYCLE AND METHOD OF MANUFACTURING THE SAME

FIELD OF THE INVENTION

The present invention relates to a method of manufacturing carbon fiber rim for bicycle and a carbon fiber rim for bicycle.

BACKGROUND OF THE INVENTION

TW Patent No. 1327533 discloses a method of manufacturing carbon fiber rim for bicycle contains steps of: (a). weaving plural carbon fiber braids, wherein two ends of each carbon fiber braid forms are an axial end portion of at least one carbon fiber weaving material; (b). soaking the at least one carbon fiber weaving material in resin; (c). placing the at least one carbon fiber weaving material in a mold; (d). solidifying the at least one carbon fiber weaving material by hot pressing; such that the carbon fiber rim is produced.

However, the mold is comprised of an upper mold part and a lower mold part, and the at least one carbon fiber weaving material only contacts with the upper mold part, when the upper mold part contacts with the lower mold part, the at least one carbon fiber weaving material cannot completely full of the upper mold part, so it cannot contacts with a cavity of the mold tightly, thus producing the carbon fiber rim with poor precision and profile.

The present invention has arisen to mitigate and/or obviate the afore-described disadvantages.

SUMMARY OF THE INVENTION

The primary object of the present invention is to provide a method of manufacturing carbon fiber rim for bicycle which produces carbon fiber rim of varying specifications, such as a carbon fiber rim which do not have an inner tube or has an inner tube.

Secondary object of the present invention is to provide a method of manufacturing carbon fiber rim for bicycle which produces the carbon fiber rim with excellent strength.

Further object of the present invention is to provide a method of manufacturing carbon fiber rim for bicycle which produces the carbon fiber rim with light weight and high rigidity.

Another object of the present invention is to provide a method of manufacturing carbon fiber rim for bicycle which produces the carbon fiber rim easily, quickly, precisely and at a low cost.

To obtain the above objectives, a method of manufacturing carbon fiber rim for bicycle contains steps of:

preparing at least one preformed mold, wherein a preformed main mold and a preformed auxiliary mold are provided, and the preformed main mold is formed in a closed ring shape and includes an arcuate face defined on an inner side thereof and a flat face formed on an outer side thereof opposite to the arcuate face; the preformed auxiliary mold is in a flat ring shape and includes plural first bolts inserted therein, such that plural carbon-fiber prepreg wires are rolled on the arcuate face of the preformed main mold and two sides of the preformed auxiliary mold relative to a set angle of an axis normal, and a cross section of a rolling locus of the plural carbon-fiber prepreg wires around the preformed main mold is in a U shape, and the plural carbon-fiber prepreg wires are hanged on the plural first bolts;

separating from the preformed main mold, wherein the plural bolts are removed from the preformed auxiliary mold, and the preformed auxiliary mold is separated from the preformed main mold, wherein a bending edge is defined by a height of a top side of a preformed carbon fiber case higher than the flat face of the preformed main mold and is inwardly bent to contact with the flat face of the preformed main mold, thereafter the preformed main mold is removed so as to produce the preformed carbon fiber case, and the preformed carbon fiber case has an inwardly concave cavity formed therein;

connecting with an inner framework, wherein the inner framework has a profile corresponding to a carbon fiber rim, and the inwardly concave cavity of the preformed carbon fiber case and the bending edge contact with a peripheral side of the inner framework;

solidifying, wherein the inner framework and the preformed carbon fiber case are pressed and heated to solidify the carbon fiber rim.

Preferably, the plural carbon-fiber prepreg wires are repeatedly rolled on the preformed carbon fiber case at least twice so as to form at least two rolling layers, and each rolling layer is at varying angle.

Preferably, in step of preparing the at least one preformed mold, the preformed main mold is solid and is formed in a bicycle rim shape, and the preformed auxiliary mold includes a first fence and a second fence symmetrical to the first fence, and a radial width of each of the first fence and the second fence corresponds to that of the flat face of the preformed main mold, the first fence has two first fringes defined by a thickness of the two sides of the preformed auxiliary mold, and the second fence has two second fringes defined by a thickness of two ends of the preformed auxiliary mold, and the preformed auxiliary mold also includes plural holes equidistantly arranged on the two sides thereof and passing through the two first fringes so as to insert the plural first bolts.

Also, a carbon fiber rim for bicycle contains:

an inner framework having a profile corresponding to a carbon fiber rim;

a preformed carbon fiber case at least covering a part of the inner framework and being successive rolled by plural carbon-fiber prepreg wires relative to a set angle of an axis normal, wherein the plural carbon-fiber prepreg wires are repeatedly rolled on the preformed carbon fiber case at least twice so as to form at least two rolling layers, and each rolling layer is at varying angle.

DETAILED DESCRIPTION OF THE PREFERRED EMBODIMENTS

Figure 1:
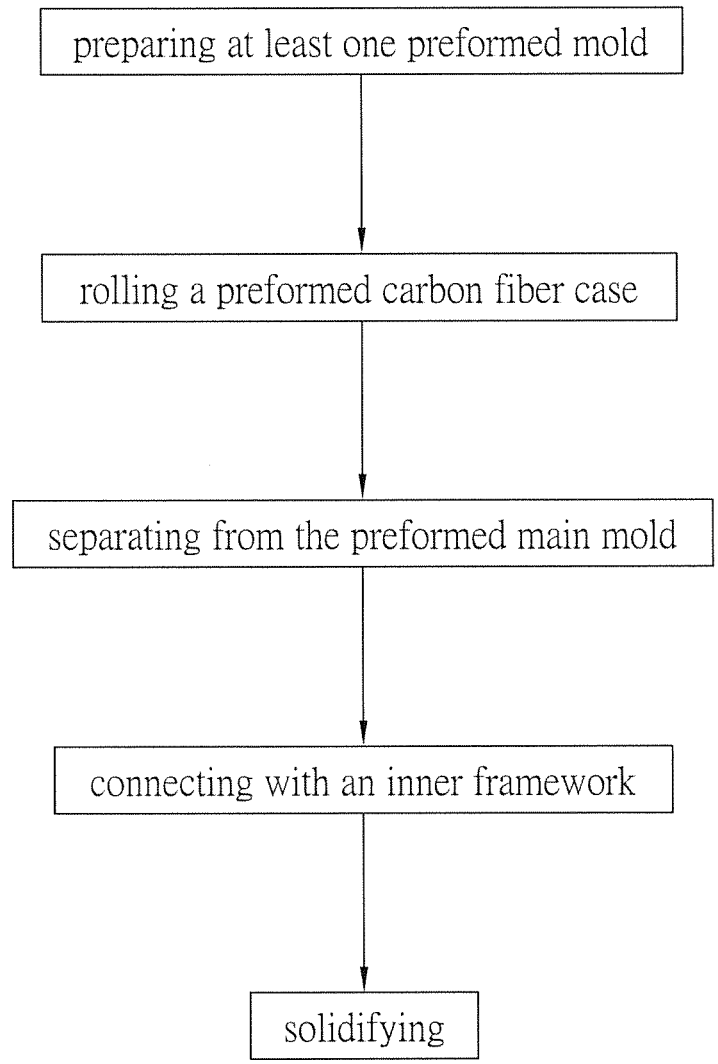
FIG. 1 is a flow chart of a method of manufacturing carbon fiber rim for bicycle according to a first embodiment of the present invention.
Figure 2:
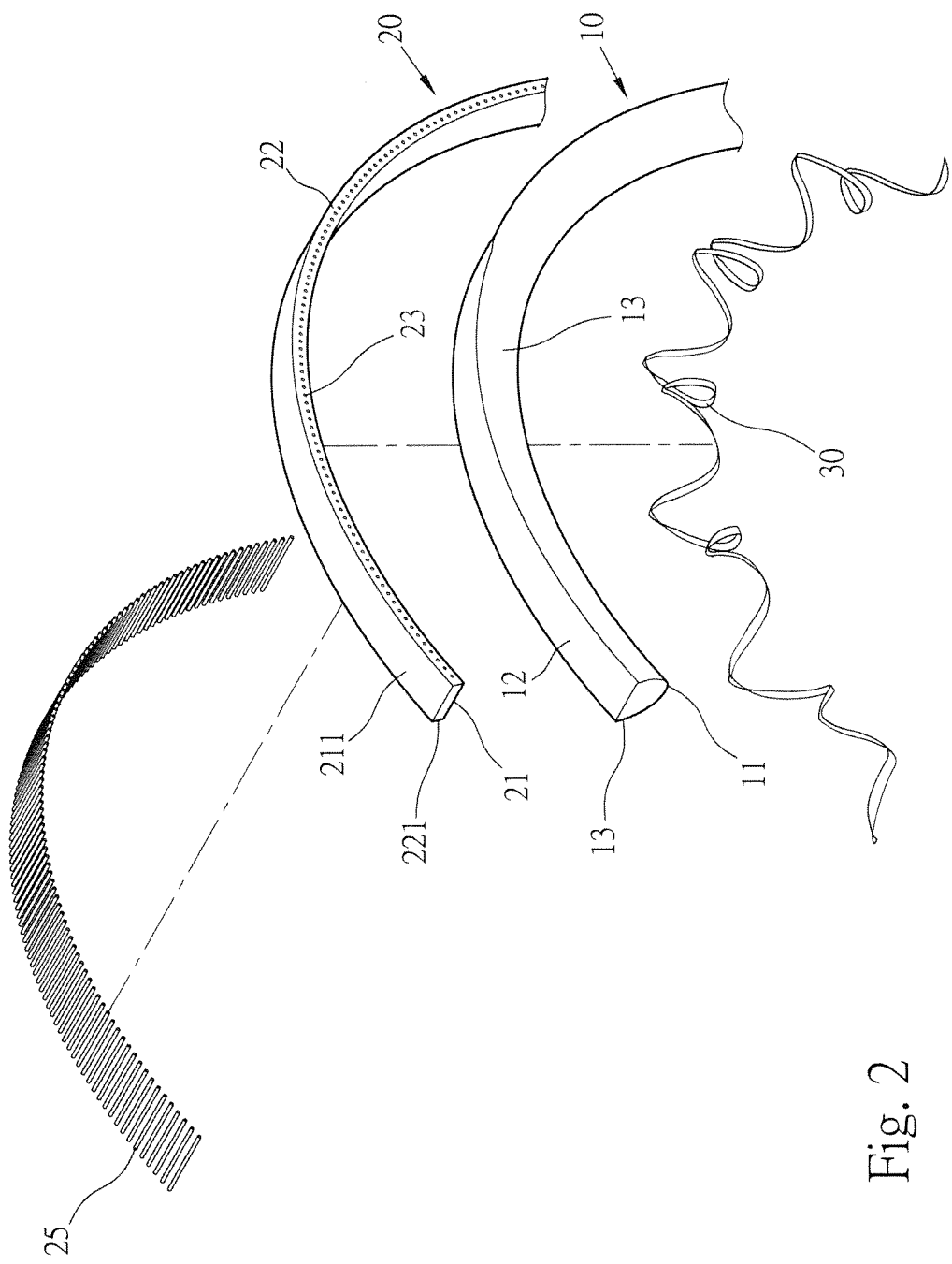
FIG. 2 is a perspective view showing the operation of the method of manufacturing the carbon fiber rim for the bicycle according to the first embodiment of the present invention.
Figure 3:
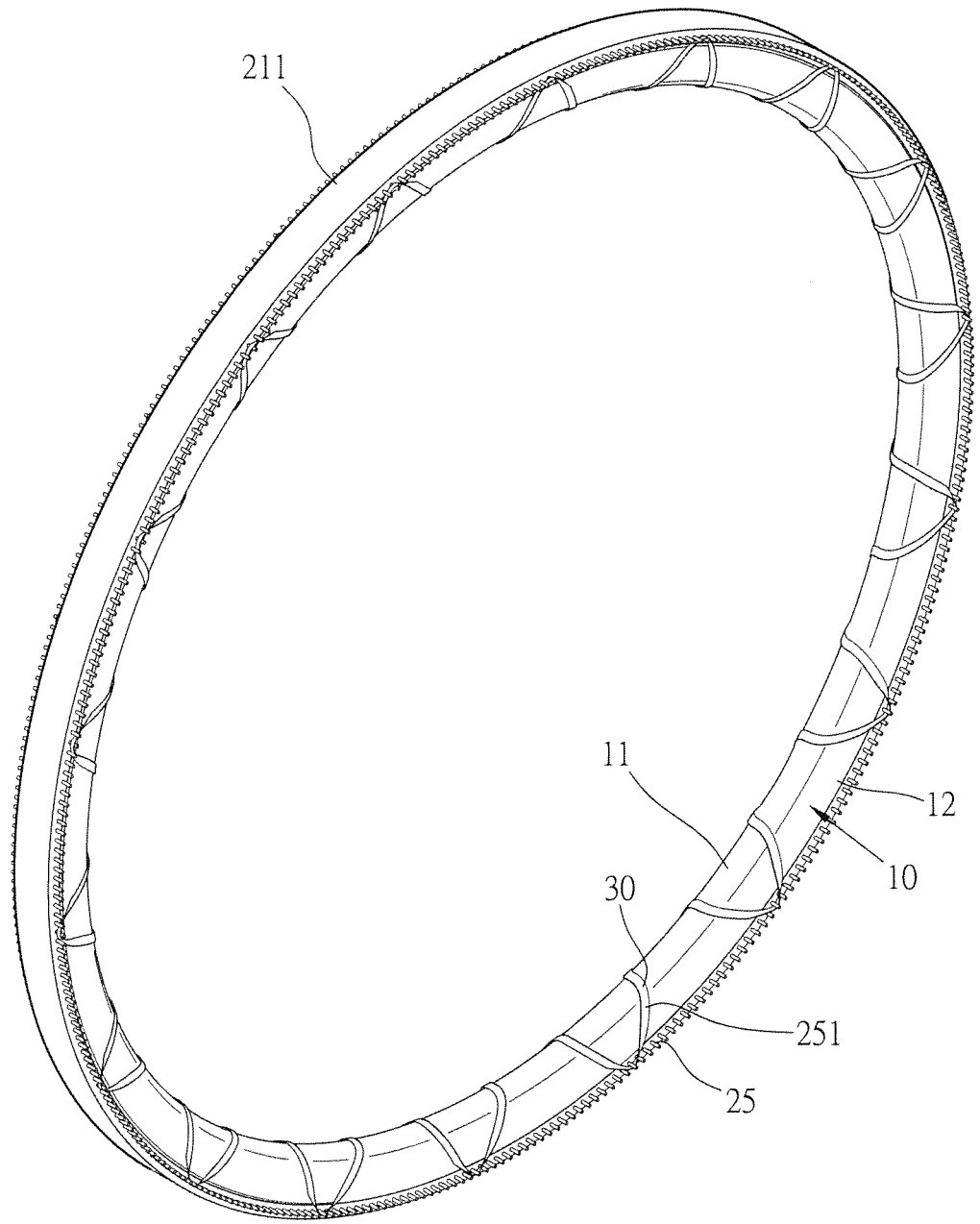
FIG. 3 is another perspective view showing the operation of the method of manufacturing the carbon fiber rim for the bicycle according to the first embodiment of the present invention.
Figure 4:
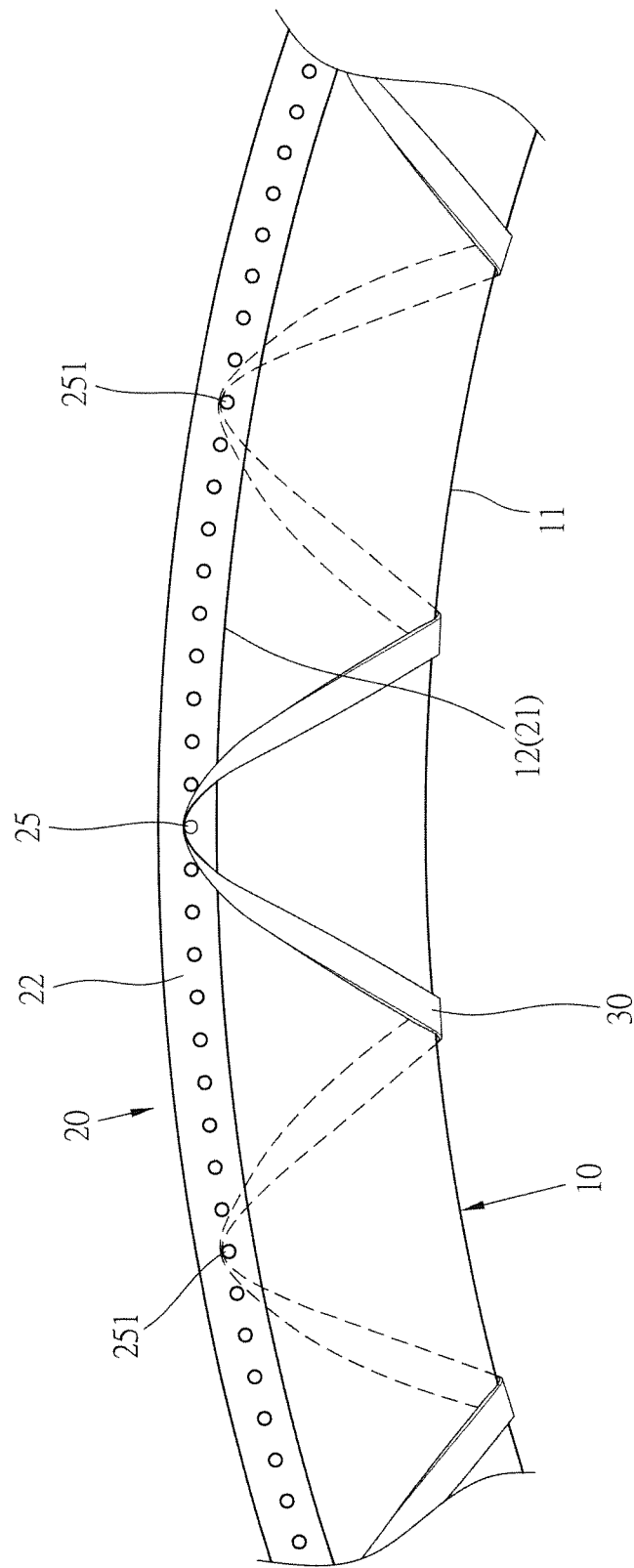
FIG. 4 is a plan view showing the operation of the method of manufacturing the carbon fiber rim for the bicycle according to the first embodiment of the present invention.
Figure 5:
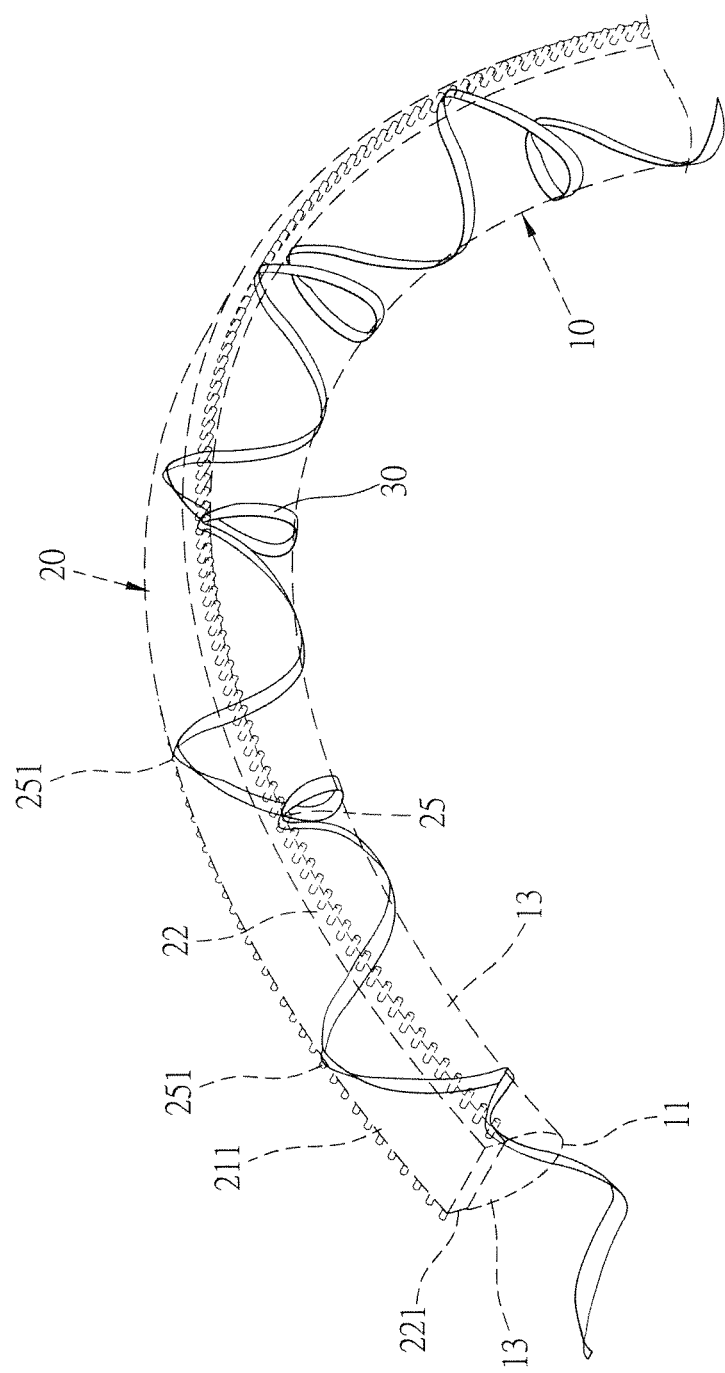
FIG. 5 is another perspective view showing the operation of the method of manufacturing the carbon fiber rim for the bicycle according to the first embodiment of the present invention.
Figure 6:
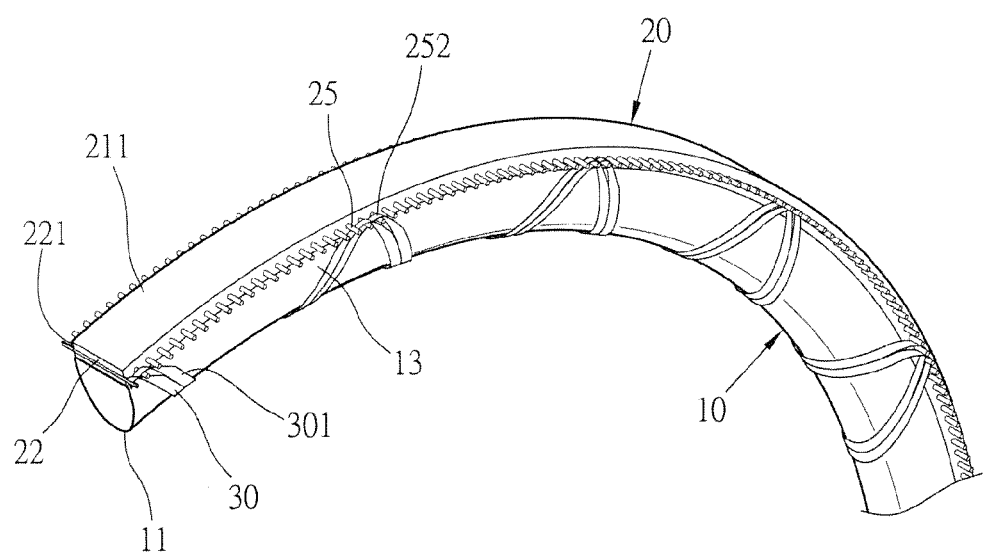
FIG. 6 is also another perspective view showing the operation of the method of manufacturing the carbon fiber rim for the bicycle according to the first embodiment of the present invention.
Figure 7:
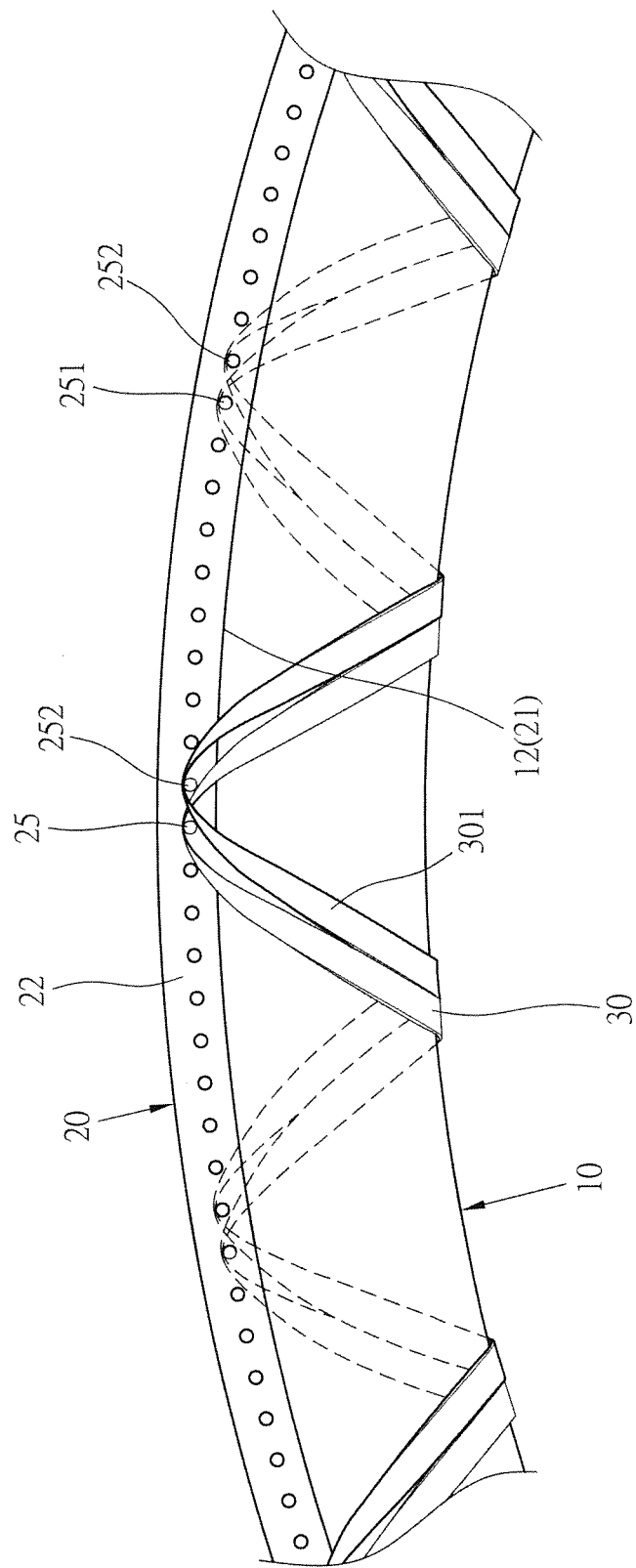
FIG. 7 is another plan view showing the operation of the method of manufacturing the carbon fiber rim for the bicycle according to the first embodiment of the present invention.
Figure 8:
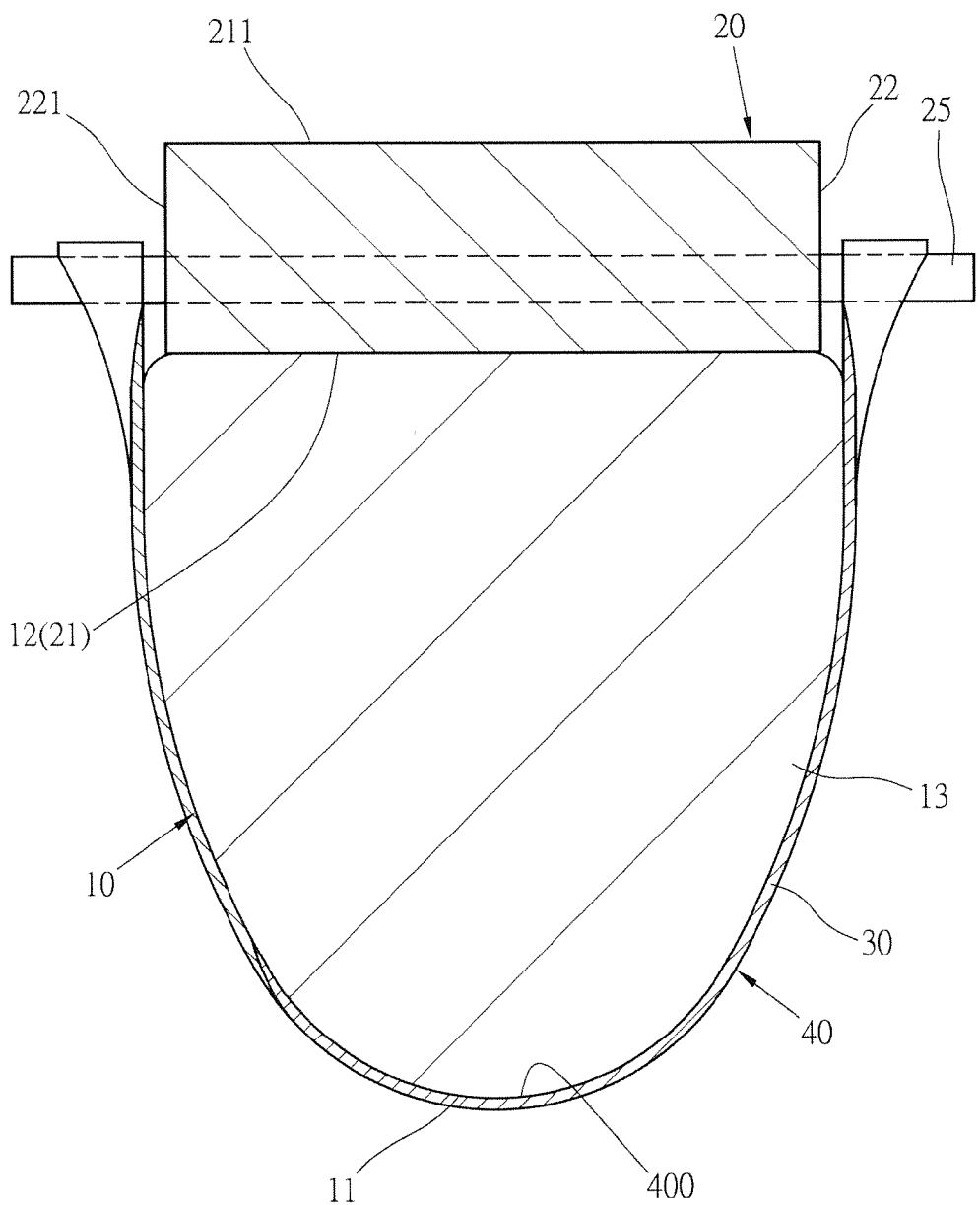
FIG. 8 is a cross sectional view showing the operation of the method of manufacturing the carbon fiber rim for the bicycle according to the first embodiment of the present invention.
Figure 9:
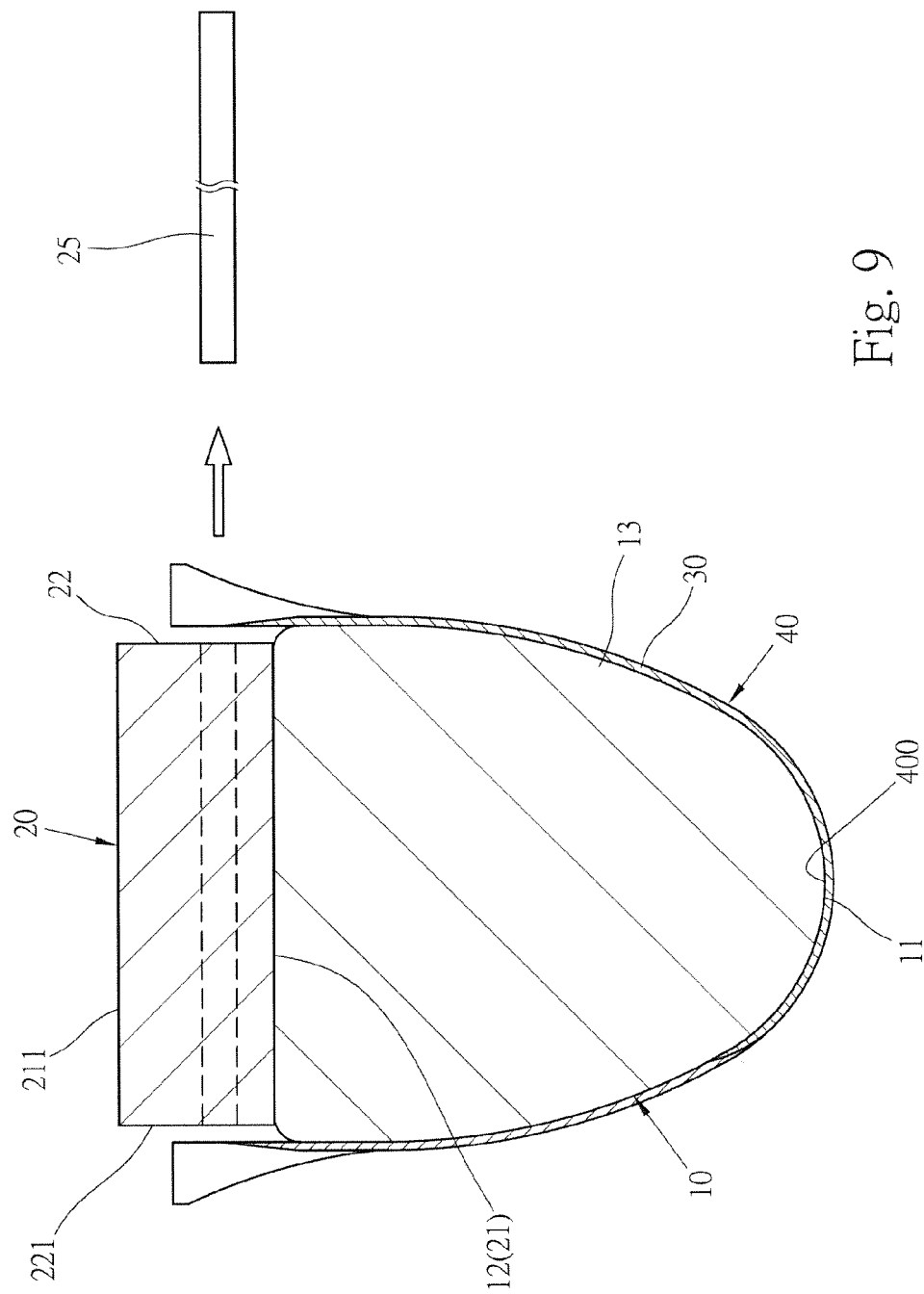
FIG. 9 is another cross sectional view showing the operation of the method of manufacturing the carbon fiber rim for the bicycle according to the first embodiment of the present invention.
Figure 10:
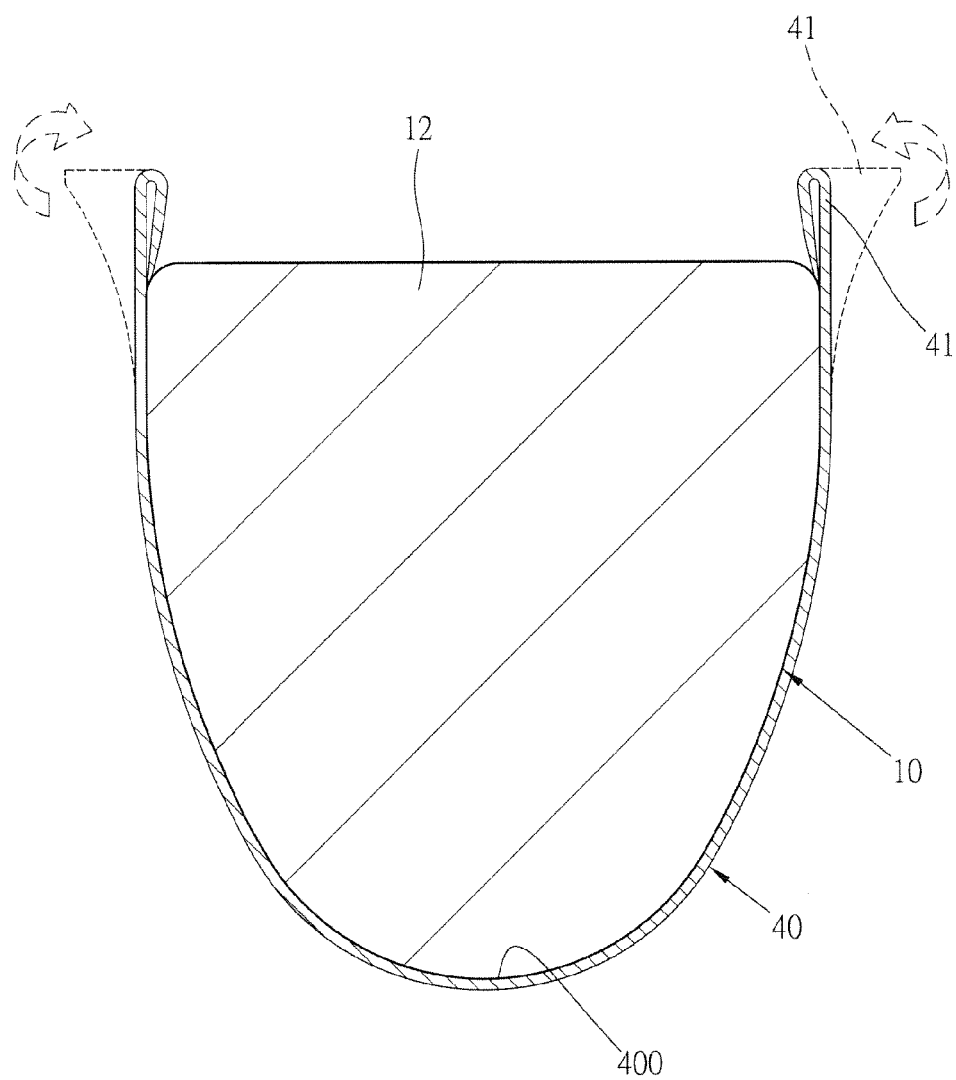
FIG. 10 is also another cross sectional view showing the operation of the method of manufacturing the carbon fiber rim for the bicycle according to the first embodiment of the present invention.
Figure 11:
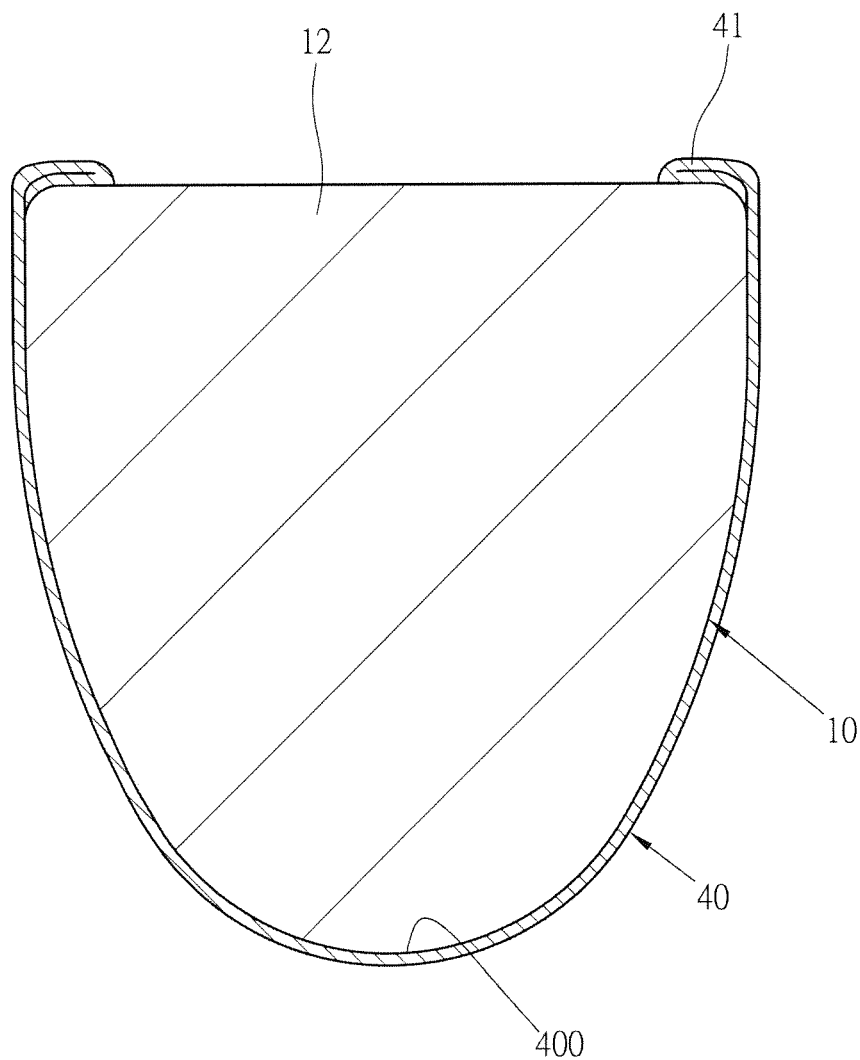
FIG. 11 is still another cross sectional view showing the operation of the method of manufacturing the carbon fiber rim for the bicycle according to the first embodiment of the present invention.
Figure 12:
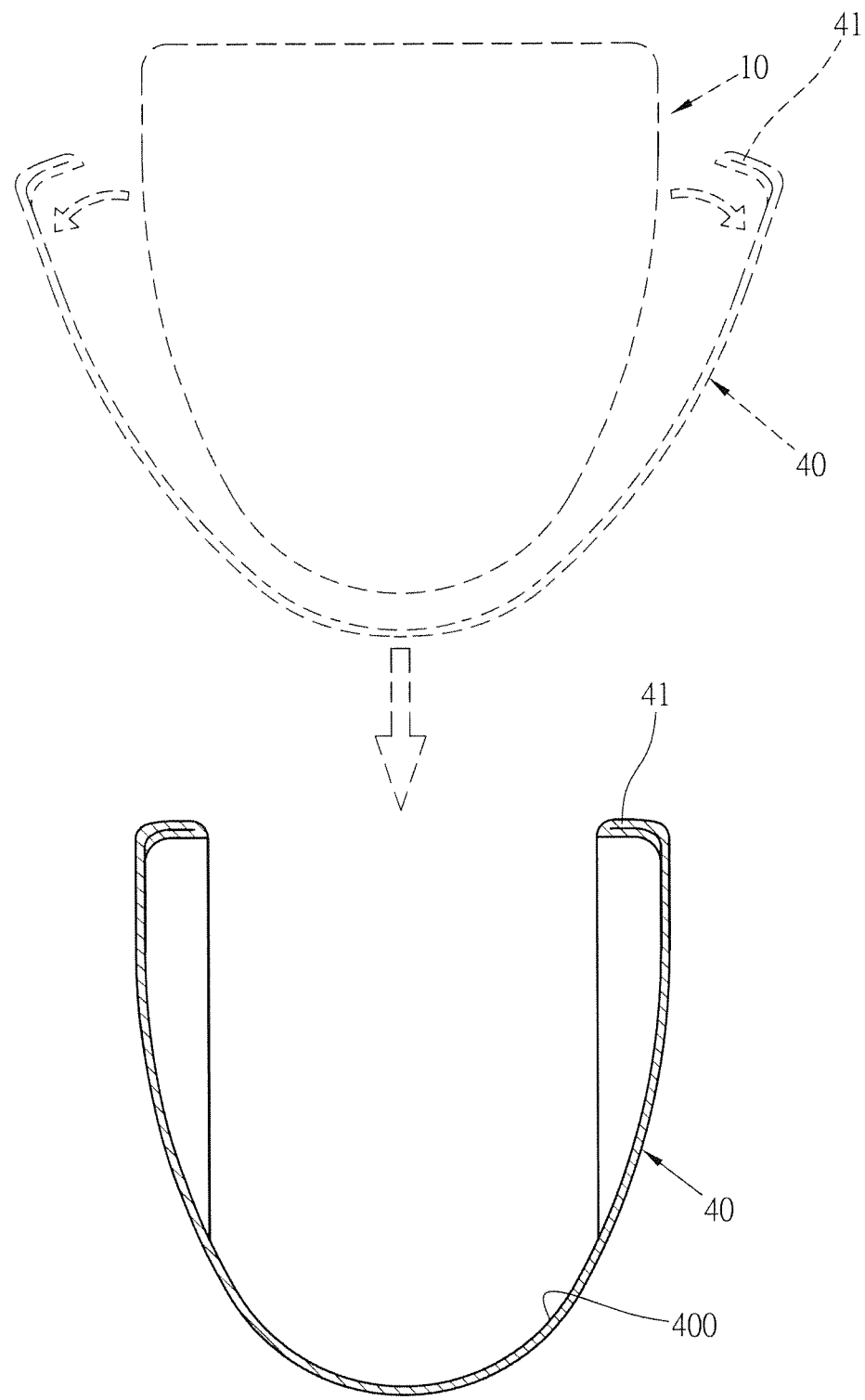
FIG. 12 is another cross sectional view showing the operation of the method of manufacturing the carbon fiber rim for the bicycle according to the first embodiment of the present invention.
Figure 13:
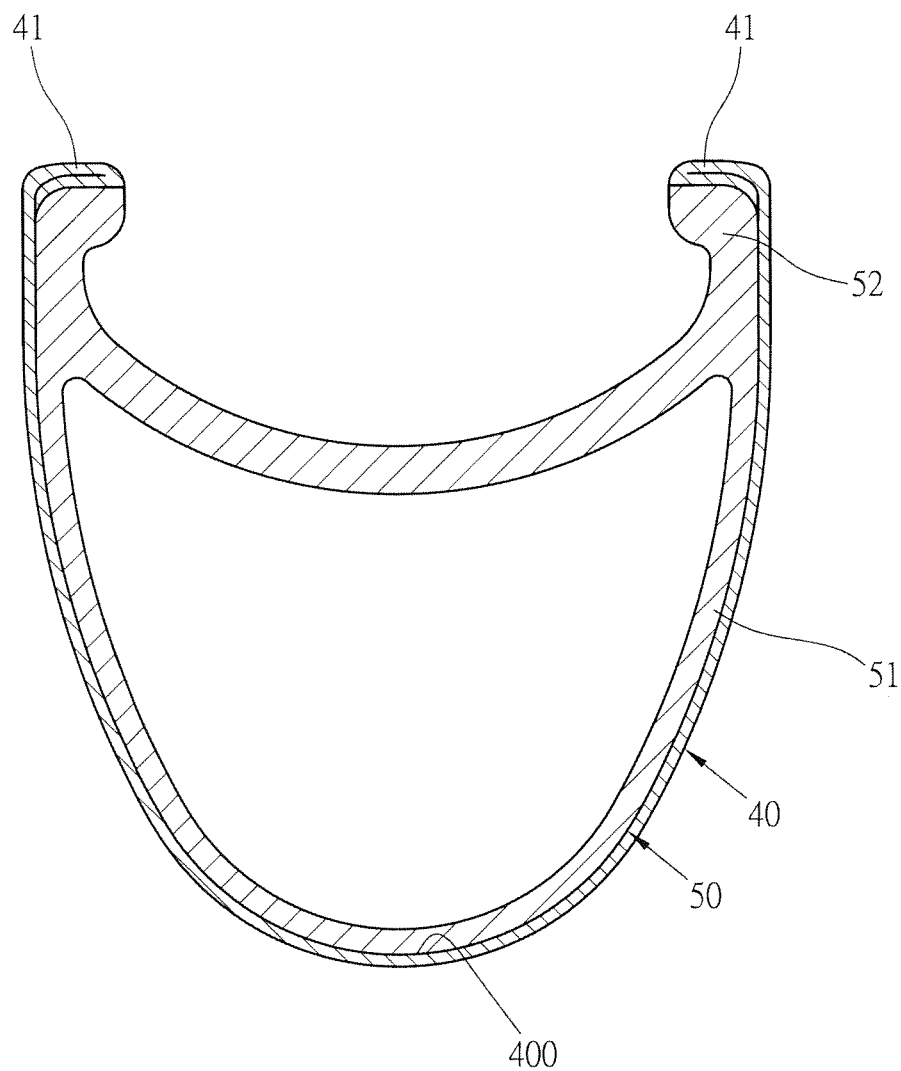
FIG. 13 is another cross sectional view showing the operation of the method of manufacturing the carbon fiber rim for the bicycle according to the first embodiment of the present invention.

Referring further to FIGS. 1 and 2, a method of manufacturing carbon fiber rim for bicycle according to a first embodiment of the present invention comprises steps of:

a. preparing at least one preformed mold, wherein a preformed main mold 10 and a preformed auxiliary mold 20 are provided in step a, and the preformed main mold 10 is solid and is formed in a bicycle rim shape or in a hollow clincher tire shape, the preformed main mold 10 includes an arcuate face 11 defined on an inner side thereof, a flat face 12 formed on an outer side thereof opposite to the arcuate face 11, and two external peripheries 13 extending along two peripheral sides thereof and defined between the arcuate face 11 and the flat face 12; the preformed auxiliary mold 20 is in a flat ring shape and includes varying thickness, a first fence 21 and a second fence 211 symmetrical to the first fence 21, and a radial width of each of the first fence 21 and the second fence 211 corresponds to that of the flat face 12 of the preformed main mold 10, the first fence 21 has two first fringes 22 defined by a thickness of two sides of the preformed auxiliary mold 20, and the second fence 211 has two second fringes 221 defined by a thickness of two ends of the preformed auxiliary mold 20, and the preformed auxiliary mold 20 also includes plural holes 23 equidistantly arranged on the two sides thereof and passing through the two first fringes 22 so as to insert plural first bolts 25.

b. rolling a preformed carbon fiber case, wherein a first carbon-fiber prepreg wire 30 is made of epoxy prepreg, as shown in FIGS. 2-4, the first carbon-fiber prepreg wire 30 is used to roll the preformed main mold 10 and the preformed auxiliary mold 20 based on steps of:

contacting the first fence 21 of the preformed auxiliary mold 20 with the flat face 12 of the preformed main mold 10;

inserting the plural first bolts 25 into the plural holes 23;

rolling the first carbon-fiber prepreg wire 30 on the preformed main mold 10 and the preformed auxiliary mold 20 as illustrated in FIGS. 3 to 5, wherein the first carbon-fiber prepreg wire 30 is successively rolled at a set angle of an axis normal relative to the preformed main mold 10, and a cross section of a rolling locus of the first carbon-fiber prepreg wire 30 around the preformed main mold 10 is in a U shape, wherein the first carbon-fiber prepreg wire 30 is rolled on the arcuate face 11 of the preformed main mold 10 and the two first fringes 22 and the two second fringes 221 of the preformed auxiliary mold 20; and a rolling angle of the first carbon-fiber prepreg wire 30 is preset by matching with positions of the plural first bolts 25, i.e., the first carbon-fiber prepreg wire 30 surrounds the preformed main mold 10 and the preformed auxiliary mold 20 along the plural first bolts 25, such that the first carbon-fiber prepreg wire 30 is rolled on the arcuate face 11 of the preformed main mold 10 and the two first fringes 22 and the two second fringes 221 of the preformed auxiliary mold 20 quickly and accurately;

firstly, one end of the first carbon-fiber prepreg wire 30 is upwardly rolled around the arcuate face 11 and the external periphery 13 of the preformed main mold 10 at a predetermined angle and is hanged on a first bolt 25 of the two first fringes 22 of the preformed auxiliary mold 20, and then the first carbon-fiber prepreg wire 30 is downwardly and reversely rolled around the arcuate face 11 and the external periphery 13 of the preformed main mold 10, thereafter the first carbon-fiber prepreg wire 30 is upwardly rolled toward the two second fringes 221 of the preformed auxiliary mold 20 and is hanged on plural second bolts 251, wherein the plural second bolts 251 are equidistantly spaced apart from the plural first bolts 25, and the first carbon-fiber prepreg wire 30 is downwardly and reversely rolled around the arcuate face 11 and the external periphery 13 of the preformed main mold 10 and is upwardly rolled toward the two first fringes 22 of the preformed auxiliary mold 20 at a certain angle, wherein the first carbon-fiber prepreg wire 30 is also hanged on another bolt 25, such that the first carbon-fiber prepreg wire 30 can be repeatedly rolled around the preformed main mold 10 and the preformed auxiliary mold 20;

as shown in FIGS. 6-7, a second carbon-fiber prepreg wire 301 is rolled on the external periphery 13 of the preformed main mold 10 and the two first fringes 22 and the two second fringes 221 of the preformed auxiliary mold 20 and is hanged on plural third bolts 252 which are equidistantly spaced apart from one another, wherein first hanging positions where the second carbon-fiber prepreg wire 301 hang on the plural third bolts 252 are adjacent to second hanging positions where the first carbon-fiber prepreg wire 30 hang on the plural first bolts 25, and the first hanging positions are spaced apart from the second hanging positions, such that the preformed main mold 10 and the preformed auxiliary mold 20 can be also rolled by a third carbon-fiber prepreg wire and a fourth carbon-fiber prepreg wire, etc.; wherein such a rolling manner and angle are changeable, for example, after the preformed main mold 10 and the preformed auxiliary mold 20 are rolled by the first carbon-fiber prepreg wire 30 at a first angle, they are further rolled by the second carbon-fiber prepreg wire at a second angle different from a hanging angle where the first carbon-fiber prepreg wire 30 hangs on the plural first bolts 25, hence rolling angles and rolling layer numbers (i.e., the first carbon-fiber prepreg wire is a first rolling layer, the second carbon-fiber prepreg wire is a first rolling layer, and so on.) are changeable, wherein, each rolling layer is at varying angle.

c. separating from the preformed main mold, as shown in FIGS. 7 to 9, after the preformed main mold 10 and the preformed auxiliary mold 20 are rolled by the first carbon-fiber prepreg wire 30 and the second carbon-fiber prepreg wire 301, a preformed carbon fiber case 40 is removed from the preformed main mold 10 and the preformed auxiliary mold 20, and the plural first bolts 25 are removed from the plural holes 23, as illustrated in FIGS. 10 and 11, the preformed auxiliary mold 20 is removed from the flat face 12 of the preformed main mold 10, wherein a bending edge 41 is defined by a height of a top side of the preformed carbon fiber case higher than the flat face 12 of the preformed main mold 10 and is inwardly bent to contact with the flat face 12 of the preformed main mold 10;

removing the preformed carbon fiber case 40 from the external periphery 13 of the preformed main mold 10, as illustrated in FIG. 12, wherein the preformed carbon fiber case 40 is formed in a U shape and has an inwardly concave cavity 400.

d. connecting with an inner framework, as shown in FIG. 13, wherein when manufacturing the carbon fiber rim having an inner tube, the preformed carbon fiber case 40 connects with a peripheral side of the inner framework 50 before guiding the preformed carbon fiber case 40 into a die, wherein the inner framework 50 is made of aluminum or carbon-fiber composite material and has a profile corresponding to the carbon fiber rim having the inner tube, the inner framework 50 also has a hollow surrounding flange 51 and two hooking edges 52 extending outwardly from a top end of the hollow surrounding flange 51, such that the inwardly concave cavity 400 of the preformed carbon fiber case 40 is covered by the hollow surrounding flange 51 of the inner framework 50, the inner framework 50 is covered by the inwardly concave cavity 400, and the bending edge 41 contacts with the two hooking edges 52 along the hollow surrounding flange 51.

e. solidifying, wherein the inner framework 50 and the preformed carbon fiber case 40 are placed in the die to be pressed and heated after the inner framework 50 is connected with the preformed carbon fiber case 40, and then the inner framework 50 and the preformed carbon fiber case 40 are solidified and are removed from the die, thus finishing the carbon fiber rim having the inner tube.

Figure 14:
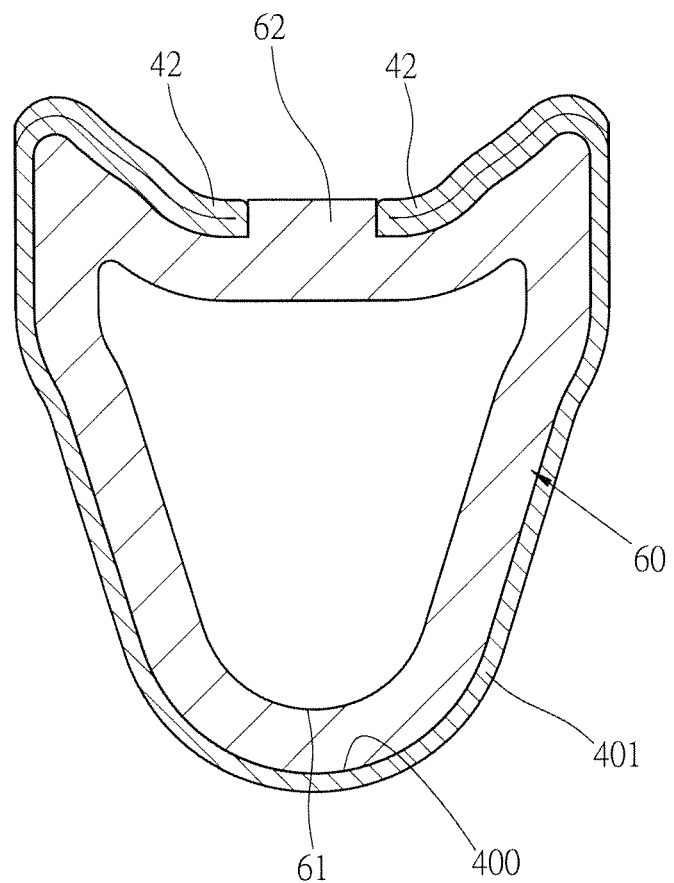
FIG. 14 is a cross sectional view showing the operation of the method of manufacturing the carbon fiber rim for the bicycle according to a second embodiment of the present invention.

Referring to FIG. 14, a carbon fiber rim according to a second embodiment of the present invention is produced, wherein the carbon fiber rim does not have an inner tube, and a length of a bending edge 42 of a preformed carbon fiber case 401 is longer than that of the bending edge 41 of the preformed carbon fiber case 40, accordingly in step of preparing the at least one preformed mold, another preformed auxiliary mold 20 with a thicker thickness is provided so that heights of the plural first bolts 25 of the preformed auxiliary mold 20 and the arcuate face 11 are defined to match with the bending edge 42. An inner framework 60 has a hollow surrounding flange 61 and a projection 62 extending outwardly from a central portion of a top end of a hollow surrounding flange 61, such that the preformed carbon fiber case 401 covers the hollow surrounding flange 61 of the inner framework 60, and two end portions of the bending edge 42 contact and flush with an outer peripheral side of the projection 62, and then the inner framework 60 and the preformed carbon fiber case 401 are pressed and heated so as to solidify the carbon fiber rim which does not have the inner tube.

Figure 15:
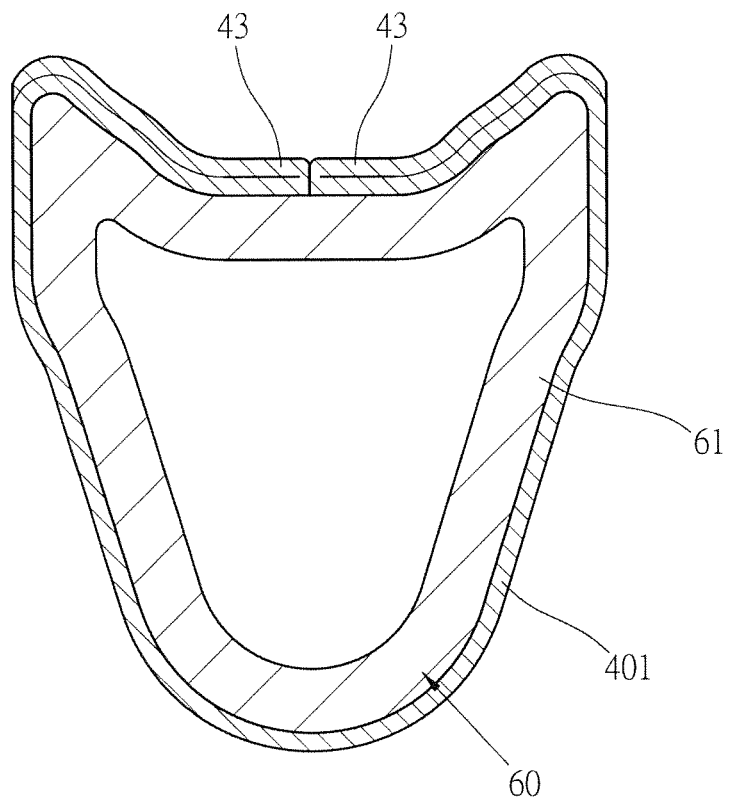
FIG. 15 is a cross sectional view showing the operation of the method of manufacturing the carbon fiber rim for the bicycle according to a third embodiment of the present invention.

With reference to FIG. 15, a carbon fiber rim according to a third embodiment of the present invention is manufactured, wherein the carbon fiber does not have an inner tube but has a hollow surrounding flange 61, and a length of a bending edge 43 of a preformed carbon fiber case 40 is longer than that of the bending edge 42 of the second embodiment, and two end portions of the bending edge 43 contact with each other, the bending edge 43 covers the inner framework 60, and then the inner framework 60 and the preformed carbon fiber case 401 are pressed and heated so as to solidify the carbon fiber rim which does not have the inner tube.

To produce the carbon fiber rim which has the inner tube or does not have the inner tube, the first carbon-fiber prepreg wire 30 is rolled on the preformed main mold 10 and the preformed auxiliary mold 20 by ways of the plural first bolts 25 when preforming the preformed carbon fiber case 40, and a distance between a height of the plural first bolts 25 and a height of the flat face 12 is changeable to form the bending edges 41, 42, 43 of varying length so as to produce the carbon fiber rim which has the inner tube or does not has the inner tube and to change the preformed carbon fiber case 40 easily and quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of manufacturing carbon fiber rim for bicycle comprising steps of:

preparing at least one preformed mold, wherein a preformed main mold and a preformed auxiliary mold are provided, and the preformed main mold is formed in a closed ring shape and includes an arcuate face defined on an inner side thereof and a flat face formed on an outer side thereof opposite to the arcuate face; the preformed auxiliary mold is in a flat ring shape and includes plural first bolts inserted therein, such that plural carbon-fiber prepreg wires are rolled on the arcuate face of the preformed main mold and two sides of the preformed auxiliary mold relative to a set angle of an axis normal, and a cross section of a rolling locus of the plural carbon-fiber prepreg wires around the preformed main mold is in a U shape, and the plural carbon-fiber prepreg wires are hanged on the plural first bolts;

separating from the preformed main mold, wherein the plural bolts are removed from the preformed auxiliary mold, and the preformed auxiliary mold is separated from the preformed main mold, wherein a bending edge is defined by a height of a top side of a preformed carbon fiber case higher than the flat face of the preformed main mold and is inwardly bent to contact with the flat face of the preformed main mold, thereafter the preformed main mold is removed so as to produce the preformed carbon fiber case, and the preformed carbon fiber case has an inwardly concave cavity formed therein;

connecting with an inner framework, wherein the inner framework has a profile corresponding to a carbon fiber rim, and the inwardly concave cavity of the preformed carbon fiber case and the bending edge contact with a peripheral side of the inner framework;

solidifying, wherein the inner framework and the preformed carbon fiber case are pressed and heated to solidify the carbon fiber rim.

2. The method of manufacturing the carbon fiber rim for the bicycle as claimed in claim 1, wherein the plural carbon-fiber prepreg wires are repeatedly rolled on the preformed carbon fiber case at least twice so as to form at least two rolling layers, and each rolling layer is at varying angle.

3. The method of manufacturing the carbon fiber rim for the bicycle as claimed in claim 1, wherein in step of preparing the at least one preformed mold, the preformed main mold is solid and is formed in a bicycle rim shape, and the preformed auxiliary mold includes a first fence and a second fence symmetrical to the first fence, and a radial width of each of the first fence and the second fence corresponds to that of the flat face of the preformed main mold, the first fence has two first fringes defined by a thickness of the two sides of the preformed auxiliary mold, and the second fence has two second fringes defined by a thickness of two ends of the preformed auxiliary mold, and the preformed auxiliary mold also includes plural holes equidistantly arranged on the two sides thereof and passing through the two first fringes so as to insert the plural first bolts.

4. A carbon fiber rim for bicycle comprising:
  an inner framework having a profile corresponding to a carbon fiber rim;
  a preformed carbon fiber case at least covering a part of the inner framework and being successive rolled by plural carbon-fiber prepreg wires relative to a set angle of an axis normal, wherein the plural carbon-fiber prepreg wires are repeatedly rolled on the preformed carbon fiber case at least twice so as to form at least two rolling layers, and each rolling layer is at varying angle.

\* \* \* \* \*